US011955837B2

(12) United States Patent
Huber et al.

(10) Patent No.: US 11,955,837 B2
(45) Date of Patent: Apr. 9, 2024

(54) POWER SYSTEM

(71) Applicant: INNIO Jenbacher GmbH & Co OG, Jenbach (AT)

(72) Inventors: Johannes Huber, Kramsach (AT); Ingo Walch, Absam (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 78 days.

(21) Appl. No.: 17/794,952

(22) PCT Filed: Jan. 23, 2020

(86) PCT No.: PCT/AT2020/060022
§ 371 (c)(1),
(2) Date: Jul. 22, 2022

(87) PCT Pub. No.: WO2021/146760
PCT Pub. Date: Jul. 29, 2021

(65) Prior Publication Data
US 2023/0053593 A1 Feb. 23, 2023

(51) Int. Cl.
*H02J 3/32* (2006.01)
*H02J 3/38* (2006.01)
(Continued)

(52) U.S. Cl.
CPC ............... *H02J 9/062* (2013.01); *H02J 3/32* (2013.01); *H02J 3/381* (2013.01); *H02J 3/46* (2013.01);
(Continued)

(58) Field of Classification Search
CPC ........ H02J 3/28; H02J 3/32; H02J 3/38; H02J 3/381; H02J 3/46; H02J 7/0048;
(Continued)

(56) References Cited

U.S. PATENT DOCUMENTS 8,975,767 B2   3/2015  Algrain
10,270,248 B2  4/2019  Janardhan et al.
(Continued)

FOREIGN PATENT DOCUMENTS

WO   2018/156647 A1   8/2018

OTHER PUBLICATIONS

PCT International Preliminary Report; Application No. PCT/AT2020/060022; dated Oct. 3, 2021; 8 pages.
(Continued)

*Primary Examiner* — Levi Gannon
(74) *Attorney, Agent, or Firm* — Fletcher Yoder, P.C.

(57) ABSTRACT

A power system includes at least one generator driven by at least one of a number (N) of prime movers, at least one energy storage device, and at least one control device, wherein the generator and the energy storage device provide electrical energy to a power grid having an external load. The power system includes at least one first measuring device for determining at least one first signal for a computer to determine what amount of electrical power ($\Sigma P_{G,i}$) has to be generated by the at least one generator to meet a power requirement ($P_{load}$) of the external load. The at least one control device is configured to receive the at least one first signal and to influence the control of the speed ($n_i$) of the at least one of the number (N) of prime movers or the frequency (f) of the power grid taking into account the at least one signal to change the mechanical power generated by the at least one of the number (N) of prime movers such that the electrical power provided by the at least one generator approaches the power requirement ($P_{load}$) of the external load in situations where the power requirement ($P_{load}$) of the external load is at least partially provided for by the at least one energy storage device.

20 Claims, 2 Drawing Sheets

(51) Int. Cl.
  *H02J 3/46*    (2006.01)
  *H02J 7/00*    (2006.01)
  *H02J 7/14*    (2006.01)
  *H02J 9/06*    (2006.01)

(52) U.S. Cl.
  CPC ............ *H02J 7/0048* (2020.01); *H02J 7/007* (2013.01); *H02J 7/1415* (2013.01); *H02J 7/143* (2020.01)

(58) Field of Classification Search
  CPC .. H02J 7/007; H02J 7/14; H02J 7/1415; H02J 7/143; H02J 9/062
  See application file for complete search history.

(56) References Cited

U.S. PATENT DOCUMENTS

| | | |
|---|---|---|
| 10,862,310 B2 | 12/2020 | Taimela et al. |
| 2009/0184575 A1* | 7/2009 | Armstrong .............. B60L 50/13 307/9.1 |
| 2010/0270864 A1* | 10/2010 | Vyas ......................... H02J 7/35 290/40 B |
| 2014/0159365 A1 | 6/2014 | Algrain |
| 2015/0275750 A1 | 10/2015 | Algrain |
| 2016/0094085 A1 | 3/2016 | Janardhan et al. |
| 2017/0133852 A1* | 5/2017 | Macdonald ............... H02J 5/00 |
| 2019/0157872 A1 | 5/2019 | Taimela et al. |

OTHER PUBLICATIONS

PCT International Search Report and Written Opinion; Application No. PCT/AT2020/060022; dated Apr. 8, 2020; 12 pages.

\* cited by examiner

POWER SYSTEM

CROSS-REFERENCE TO RELATED APPLICATION

This application is a National Stage entry from, and claims benefit of, PCT Application No. PCT/AT2020/060022, filed on Jan. 23, 2020; entitled "POWER SYSTEM", which is herein incorporated by reference in its entirety.

BACKGROUND

The invention concerns a system and method for controlling a power system.

In a power system consisting of at least one prime mover and at least one energy storage device operating in an isolated power grid (e.g., microgrid), both, prime mover(s) and storage unit(s), react to changes in the power requirement of an external load coupled to the power grid by changing their power output to match the load and minimize speed deviations (via their control devices). In order to detect these changes, it is common to measure speed deviations of the prime mover(s) from a speed reference.

Use of an energy storage device can mask occurrence of transient behavior in a power system to a control device of a prime mover or a generator since, e.g., a drop in speed of the prime mover, which would occur almost immediately at the beginning of a transient behavior of the power system caused by a sudden increase of a power requirement of the external load without the presence of the power input into the power grid by the energy storage device, is delayed or damped. The same holds true if a power requirement of the external load suddenly decreases causing a rise in speed of the prime mover.

U.S. Pat. No. 8,975,767 B1 discloses a "Control System for Load Sharing Between a Generator Set and an Inverter-Based Energy Storage." US 2016/0945085 A1 discloses a "System and Method to Improve Engine Response During Hybrid Power Generation."

BRIEF DESCRIPTION

The disclosed embodiment provides a power system, a prime mover and a method to control at least one prime mover which can deal better with transient behavior of the power system. In particular, the disclosed embodiment enables a power system to work with at least one energy storage device of reduced energy storage capacity. In particular, the disclosed embodiment enables a prime mover of a power system to respond faster to a transient behavior of the power system, e.g., a change in a power requirement of the external load.

The foregoing improvements are being achieved by a system and method having the features described in detail below and set forth in the claims.

According to one aspect of the disclosed embodiment, a power system includes:
at least one first measuring device is provided for determining at least one first signal which can be used by a computer to determine what amount of electrical power has to be generated by the at least one generator to meet a power requirement of the external load;
the at least one control device is configured to receive the at least one first signal and to influence the control of the speed of the at least one of the number of prime movers or the frequency of the power grid (via a change of the mechanical power of the prime movers leading to a proportional change of the electrical power of the generators) taking into account the at least one signal in order to change mechanical power generated by the at least one of the number of prime movers such that electrical power provided by the at least one generator approaches the energy requirement of the external load in situations where power requirement of the external load is at least partially provided for by the at least one energy storage device;
wherein the at least one control device is configured to control the variable speed of the at least one of the number of prime movers and, at least temporarily, apply an additive or multiplicative feed-forward-control of actuators of the at least one of the number of prime movers proportional to the received at least one first signal to influence the mechanical power produced by the prime mover, wherein the at least one first signal is representative for the electric power provided by the at least one energy storage device to the power grid.

Consequently, electrical power provided by the at least one energy storage device to the power grid changes to or below a pre-determined value, preferably zero.

According to another aspect of the disclosed embodiment, a prime mover which can be used to generate mechanical power by providing a mechanical drive force, is provided with at least one control device. In an operating state of the prime mover in which the prime mover is coupled to a generator to provide electrical energy to an external load via a power grid, the at least one control device is configured to, at least temporarily, in situations where power requirement of the external load is at least partially provided for by the at least one energy storage device:
receive at least one first signal to determine what amount of electrical power has to be generated by the at least one generator to meet a power requirement of the external load;
control a variable speed of the prime mover in dependence on the at least one first signal in order to change mechanical power generated by the prime mover such that electrical power provided by the at least one generator approaches a power requirement of the external load;
wherein the at least one control device is configured to control the variable speed of the prime mover and, at least temporarily, apply an additive or multiplicative feed-forward-control of an actuator of the prime mover proportional to the received at least one first signal to influence the mechanical power generated by the prime mover, wherein the at least one first signal is representative for the electric power provided by the at least one energy storage device to the power grid.

Consequently, electrical power provided by the at least one energy storage device to the power grid changes to or below a pre-determined value, preferably zero.

According to yet another aspect of the disclosed embodiment, a method has the following steps in situations where power requirement of the external load is at least partially provided for by the at least one energy storage device
at least one first signal is provided which can be used by a computer to determine what amount of electrical power has to be generated by the at least one generator to meet a power requirement of the external load, wherein the at least one first signal is representative for the electric power provided by the at least one energy storage device to the power grid;

the variable speed of the at least one prime mover or a frequency of the power grid is controlled in dependence on the at least one signal in order to change mechanical power generated by the at least one prime mover such that electrical power provided by the at least one generator approaches the power requirement of the external load; and applying, at least temporarily, an additive or multiplicative feed-forward-control of an actuator of the at least one prime mover proportional to the received at least one first signal to influence the mechanical power generated by the at least one prime mover.

Consequently, electrical power provided by the at least one energy storage device to the power grid changes to or below a pre-determined value, preferably zero.

The phrase "situations where power requirement of the external load is at least partially provided for by the at least one energy storage device" is to be understood to mean that the at least one energy storage device provides electrical
- power to the external load if power requirement of the external load suddenly increases and cannot momentarily be provided for by the at least one generator, and
- the at least one energy storage device receives electrical power from the external load if power requirement of the external load suddenly decreases or the external load becomes intermittently generative and too much electrical power is provided by the at least one generator respectively.

The at least one energy storage device serves to compensate transient behavior of the power system caused by temporary variations between power requirements of the external load coupled to the power grid and the electrical energy provided to the power grid by the prime movers via the generators coupled to the power grid. If, for example, the power requirement of the external load increases, this increase would intermittently lead to a decreasing frequency of the power grid until a central control device for all the prime movers or individual control devices of the prime movers can control the prime movers to increase mechanical energy provided to their output shafts. However, if at least one energy storage device is present, energy stored in the at least one energy storage device will be input to the power grid to cover the increase in load until the prime movers reach a new stationary state in which they are able to input enough energy into the power grid via the generators to deal with the increased power requirement of the external load. The same situation holds true if power requirement of the external load decreases or the external load becomes intermittently generative. In this case, the at least one energy storage device can be used to store surplus energy transmitted by the power grid.

In conventional power systems, use of an energy storage device can mask occurrence of transient behavior in a power system to a control device of a prime mover or a generator since a pronounced drop in speed of the output shaft of the prime mover or a pronounced change in frequency of the power grid which would occur almost immediately at the beginning of a transient behavior of the power system without the presence of the power input into the power grid by the energy storage device is delayed or damped (only a relatively small drop in speed or change of frequency occurs which is usually used to command the energy storage device to become active). It depends on the rated power level of the energy storage device how large the remaining speed drop is. The power provided by the energy storage device into the grid can be interpreted as a change of the external load that is visible to the prime movers.

Once the energy storage device is exploited to provide power into the electrical power grid and therefore serves at least a portion of the external load, the difference between the electrical power provided by a generator to which the prime mover is coupled by its output shaft of the prime mover and electrical power required by the external load is larger than it would have been if—as is the case without the presence of the energy storage device—the increased power demand by the external load would have immediately led to a pronounced drop in speed of the output shaft or a pronounced drop in frequency of the power grid as in this case the control device of the prime mover or the generator could have reacted immediately and would have increased its power towards matching the external load and reducing the speed deviation from its reference.

This results in a less aggressive response of the control device with respect to speed control of the prime mover or frequency control of the power grid resulting in a slow power build up. Especially, if the energy storage device becomes fully discharged, this can in a worst case cause a larger transient with worse classification with respect to ISO 8528-5:2018.

The disclosed embodiment forces the control device(s) of the prime mover(s) or the power grid to react with the same aggressiveness as if there were no energy storage device. This exploits the full transient capability of the system "energy storage device(s)+prime mover(s)" and the energy storage device(s) can be chosen smaller as it is not a problem if it/they fully discharge(s) during a transient event.

There are different ways to determine what amount of electrical power has to be generated by the at least one generator to meet a power requirement of the external load, e.g., by using a first signal which is representative for:
electrical power provided by the at least one energy storage device to the power grid; and/or
the command of electrical power provided by the at least one energy storage device to the power grid; and/or
a power requirement of the external load.

In the first and second case, the at least one control device has to command the number of prime movers to provide additional mechanical power (if electrical power provided by the at least one storage device is positive, i.e., the external load consumes power) such that the additional electric power resulting from the additional mechanical power in total from all of the generators equals the electrical power provided by the at least one energy storage device to the power grid.

In the first and second case, it can be beneficial to provide a separation by only providing the portion of electrical power provided by the at least one energy storage device to the power grid that is used for transient regulation (e.g., computed by a computer) or the portion of electrical power provided by the at least one energy storage device to the power grid when a transient state is detected by the computer.

A signal proportional to the power requirement of the external load can be estimated by the electrical power provided by the at least one energy storage device to the power grid and the sum of electrical powers ($\Sigma P_{G,i}$) generated by the generators, which can also serve as a control signal to determine what amount of electrical power has to be generated.

In the third case, the at least one control device additionally takes into account the amount of electrical power already provided by the generators and can determine how much electrical power is lacking.

If there are several prime movers present, it could be provided for that each of the prime movers should provide the same amount of mechanical power to its generator. Alternatively, it would be possible that individual prime movers provide different amounts of mechanical power to their generators.

In a preferred embodiment, the at least one control device is configured to control speed of the at least one of the number of prime movers and, at least temporarily, applies an additive or multiplicative feed-forward-control of actuators, or equivalently of intermediate signals such as torque demand (or other equivalent), of the at least one of the number of prime movers proportional to the received first signal to influence mechanical power produced by the prime mover. As an alternative to the feedforward control, a correction of reference of speed control proportional to the received first signal, can be used in the same way to influence mechanical power produced by the prime mover. In this way, the at least one prime mover can react faster than if speed were changed by the closed-loop-control which is used during normal operation of the prime mover.

In a preferred embodiment, at least one of the prime movers (preferably several or all of them) are of a type where an output shaft is provided which rotates at a given speed and can transfer torque, e.g., to a generator coupled to the output shaft. It is possible to arrange a gear box between the output shaft of the prime mover and a coupled generator. Speed of the output shaft depends on one hand on torque applied to the output shaft by means of the prime mover, which provides mechanical power to rotate the output shaft and, on the other hand, on a load applied to the output shaft, e.g., by a generator coupled to the output shaft. If mechanical energy provided to the output shaft equals the energy extracted by the external load, the speed of the output shaft is constant. By increasing mechanical energy to the output shaft or by decreasing the load speed of the output shaft will increase.

Preferably, mechanical energy is provided to the output shaft by cyclic combustion of an air-fuel mixture in the prime mover, e.g., as happens in a four-stroke-engine. Internal combustion engines are a preferred embodiment of prime movers, in particular, such internal combustion engines which are operated using an air-fuel-mixture where more air is present with respect to fuel than in a stoichiometric mixture (so-called lean engines or motors). It is preferred that the air-fuel-mixture is ignited by ignition means, e.g., a spark plug.

The at least one energy storage device can be in the form of a storage device for electrical energy, e.g., an accumulator, or for storage of mechanical energy and be provided with means to transform the mechanical energy to electrical energy, e.g., a combination of a flywheel and an electrical generator.

The at least one generator can be a synchronous generator or an asynchronous generator. A transformer can be arranged between the synchronous generator and the power grid.

The at least one generator outputs AC (alternating current) electrical voltage, so that at any time the power grid transmits AC electrical power having a given frequency. This frequency is supposed to remain constant at a given value. All generators coupled to the same power grid output AC electrical voltage with the same frequency, which equals the frequency of the AC electrical voltage in the power grid.

Aside from the number of prime movers present, additional sources of energy could be coupled to the power grid or to the energy storage device, e.g., photovoltaic devices, wind turbines, and the like. With respect to the disclosed embodiment, the influence of such additional sources of energy can be dealt with in the same way as with the influence of the external load, since the external sources of energy permanently reduce the effective load in the power grid.

The prime mover can be an internal combustion engine, preferably a reciprocating internal combustion engine, e.g., of the kind having a plurality of combustion chambers and pistons, in particular a reciprocating internal combustion engine with a plurality of combustion chambers provided with spark-ignition and pistons.

The prime mover and the generator can be mechanically coupled to form a genset. It is preferred that one prime mover is coupled to one generator to form the genset.

The power system can be stationary in the sense that after being assembled at a given geographical location it stays at the given geographical location.

Preferably, the power system, at least temporarily, is in the form of an isolated system (island system), i.e., the power system is not electrically connected to a power grid serving different geographical locations, in particular a public grid.

All of the above given statements hold true if the number of prime movers and/or generators of the power system is two or more. If there is more than one prime mover, the prime movers can be of different type, e.g., it would be possible that one of the prime movers is a reciprocating piston engine and another one of the prime movers is a gas turbine.

Example of the Invention:

A power system comprises a power grid, a number of prime movers and a number of generators (in the present example synchronous generators), wherein in this example each prime mover is coupled to one generator to form a genset resulting in a number of gensets. Each genset is connected to the power grid of the power system.

An external load is electrically connected to the power grid. By way of example, the external load can be a consumer of electrical energy in an industrial environment. It is possible for an external load to act temporarily as a generative device.

An energy storage device (in this example a single device though there can be more than one) is connected to the power grid. The energy storage device can exchange electrical energy with the power grid. The energy storage device can be in form of an accumulator or a capacitor or in form of a device for mechanically storing energy and transforming stored mechanical energy into electrical energy (e.g., a flywheel coupled to a generator). There can be provided power electronics to convert stored non-electrical energy into electrical energy and/or to convert DC (direct current) electrical power to AC electrical power. The power electronics can form part of a storage control device.

The energy storage device is provided with a storage control device. The storage control device influences power provided by the energy storage device to the power grid in dependence on speed of the prime movers or frequency of the power grid. The storage control device can comprise a state of charge control (this could be embodied separately from the storage control device) in order to control state of charge of the energy storage device. It can obtain as input values necessary to determine a state of charge of the energy storage device (e.g., internal voltage and/or temperature of the energy storage device if it is in the form of an accumulator or speed of a flywheel). Alternatively, the energy storage device could communicate its state of charge directly to the storage control device.

The storage control device can receive a power control signal and can control the power provided by the energy storage device to the power grid based on the power control signal. This power control signal can be provided by at least one control device (see below).

There is at least one control device (in this example each of the prime movers is provided with an individual control device and there is a central master control device), which controls a speed of each of the prime movers. Alternatively, a frequency of the power grid could be controlled by the at least one control device. Of course, each of the speeds of the prime movers and the frequency of the power grid can be converted into another provided that the generator coupled to prime mover is a synchronous generator. Speed of a prime mover can be influenced by way of actuators of the prime mover such as actuators for influencing load pressure, fuel mass, mixture ratio of fuel and air, ignition timing, and so on. Control of the frequency of the power grid can be done indirectly by changing the mechanical power of the prime mover. In this example, the at least one control device (more exactly the central master control part) can provide a power control signal to the storage control device based on measurement signals such as a frequency of the power grid and/or speed of at least one of the prime movers.

There can be provided a control device to control load split between the prime movers. This control device can form part of the at least one control device for the prime mover(s) or it could be in form of a separate device. In this embodiment, each individual control device makes this calculation.

In a situation where the power requirement of the external load changes suddenly (e.g., in the worst case as a step change, in praxis within some milliseconds to hundreds of milliseconds), the master control device senses a change in speed of at least one prime mover and/or a change in frequency of the power grid and commands the at least one energy storage device to compensate for the change of the external load such that the power requirement of the external load is at least partially provided for by the at least one energy storage device.

In this situation the master control device sends a signal to the individual control devices of the prime movers to provide the amount of power delivered by the energy storage device into the grid as a response to the load change, which is used (preferably by feed-forward-control of actuators of the at least one prime movers to influence mechanical power/or correction of reference of speed control) to immediately adapt the energy output of the prime movers to handle the transient behavior of the power grid.

In this way, the prime movers can more rapidly react to the load changes during transients than has been the case in the prior art. The energy storage device can be provided with less storage capacity.

BRIEF DESCRIPTION OF THE DRAWINGS

An embodiment of the invention is shown in FIGS. 1 and 2.

DETAILED DESCRIPTION

Figure 1:
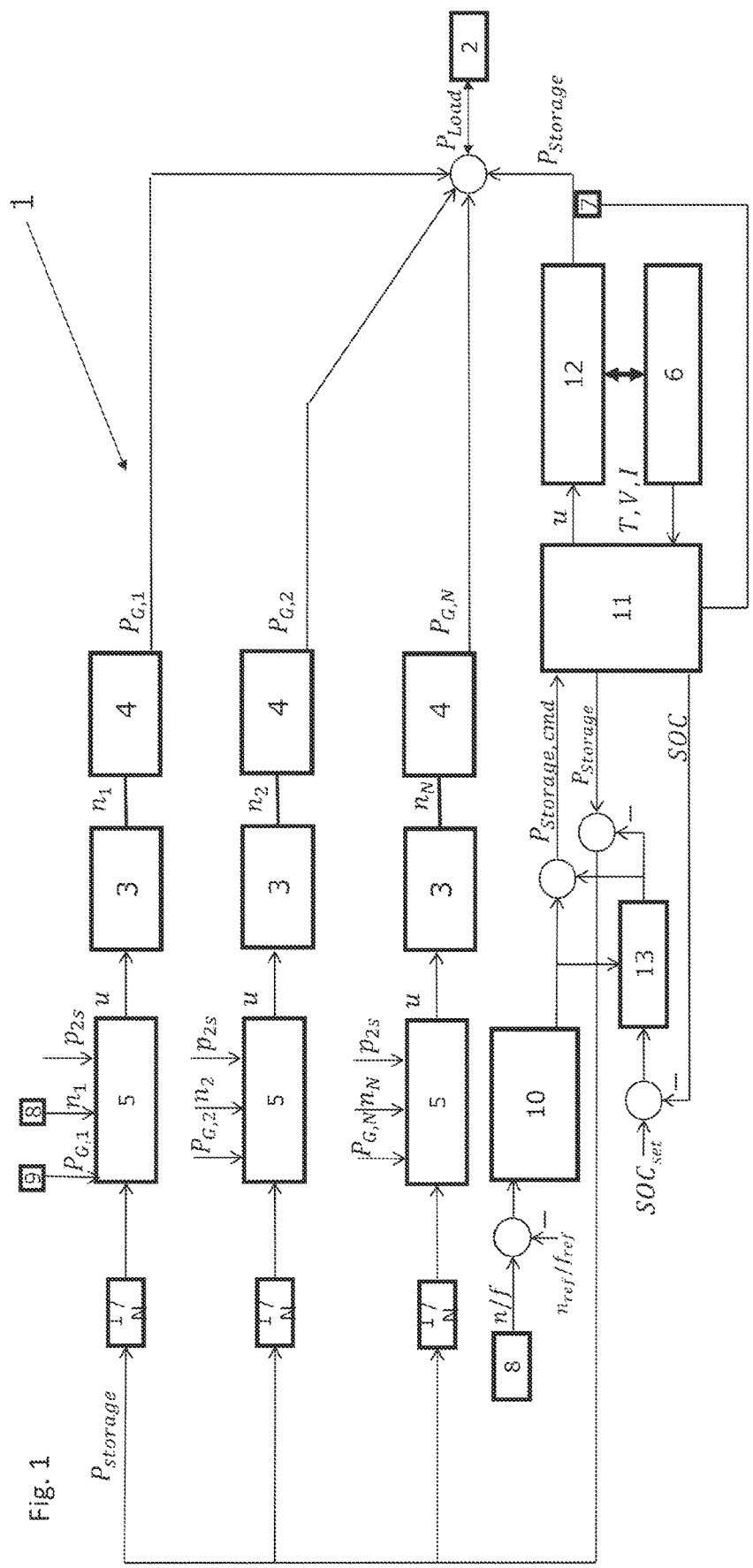
FIG. 1 shows an exemplary power system according to an embodiment of the invention with several prime movers at least temporarily controlled by a method according to the embodiment of the invention.

In the power system 1 of FIG. 1, a number N of gensets, each consisting of a prime mover 3 mechanically coupled by an output shaft to a generator 4 is shown. Each prime mover 3 provides mechanical drive force (and thus mechanical power) to its generator 4 and has a speed $n_i$ which can be measured by a second measuring device 8 (shown only for the first prime mover 3). As a result of the mechanical coupling, each generator 4 generates an electrical power $P_{G,I}$ which is transmitted by a power grid. Together, the generators 4 produce a sum of electrical powers $\Sigma P_{G,i}$. There can be a third measuring device 9 to provide a signal representing the amount of electrical power $P_{G,i}$ generated by the generator 4 to the control device 5 (only shown for the first prime mover 3). Of course, internal measurement values of the prime mover 3 can be provided to the control device 5 as is shown exemplary by the value p2s (load pressure).

An external load 2 couples to the power grid and has a momentary load requirement $P_{Load}$.

An energy storage device 6 in the form of an accumulator provided with power electronics 12 and a storage control device 11 is also coupled to the power grid. The storage control device 11 receives temperature T, current magnitude I and internal voltage V of the energy storage device 6 and sends control commands u to the power electronics 12 to command exchange of power $P_{Storage}$ (which can be negative or positive; equivalent values like current can be controlled optionally) with the power grid.

A computer 10 which in this embodiment together with a SOC control logic 13 forms a master control device receives a speed n (selected from all the speeds $n_i$ or computed from them, e.g., as an average value) and/or a frequency f of the power grid and compares them with reference values $n_{ref}$ and/or $f_{ref}$. If there is a difference between momentary values n and/or f and reference values $n_{ref}$ and/or $f_{ref}$, the computer 10 concludes that a transient behavior of the power system 1 is present and sends a command value $P_{Storage,cmd}$ for power to be provided to or received from (i.e., exchanged with) the power grid to the storage control device 11. The magnitude of $P_{Storage,cmd}$ can be, for example, proportional to the absolute speed error and its derivative (PD controller). The amount of power $P_{Storage}$ provided by energy storage device 6 is measured by a first measuring device 7 and provided via storage control device 11 to the control devices 5 of the prime movers 3 (this signal could also be directly provided to the control devices 5). In this example, only the portion of electrical power which is provided by the energy storage device 6 to the power grid that is used for transient regulation is provided to the control devices 5 by subtracting the command for state of charge control (output of SOC control logic 13). In this example, each control device 5 knows that there is a number N of (in this case identical) prime movers 3 present and can therefore divide the amount of power $P_{Storage}$ provided by the energy storage device 6 by the number N to determine what amount of electrical power $P_{G,i}$ has to be generated by the generator 4 coupled to its prime mover 3 to meet a power requirement $P_{load}$ of the external load 2 (it has to add/subtract enough mechanical power to come up for the share $P_{Storage}/N$ which, at the moment, is provided for or received by the energy storage device 6). In response to this, each control device 5 sends one or several feed forward command(s) u to actuators of its prime mover 3 to achieve this change by changing speed $n_i$ of the prime mover 3.

The SOC control logic 13 can be PI or PID and receives the difference between the (externally or internally provided) state of charge set value $SOC_{set}$ and the feedback value of the state of charge SOC (output of storage control device 11) as an input. Optionally, it can be disabled during transients by the output of computer 10.

The sum of the outputs of SOC control logic 13 and the computer 10 are used to calculate $P_{Storage,cmd}$ which is the commanded power to the storage control device 11.

Figure 2:
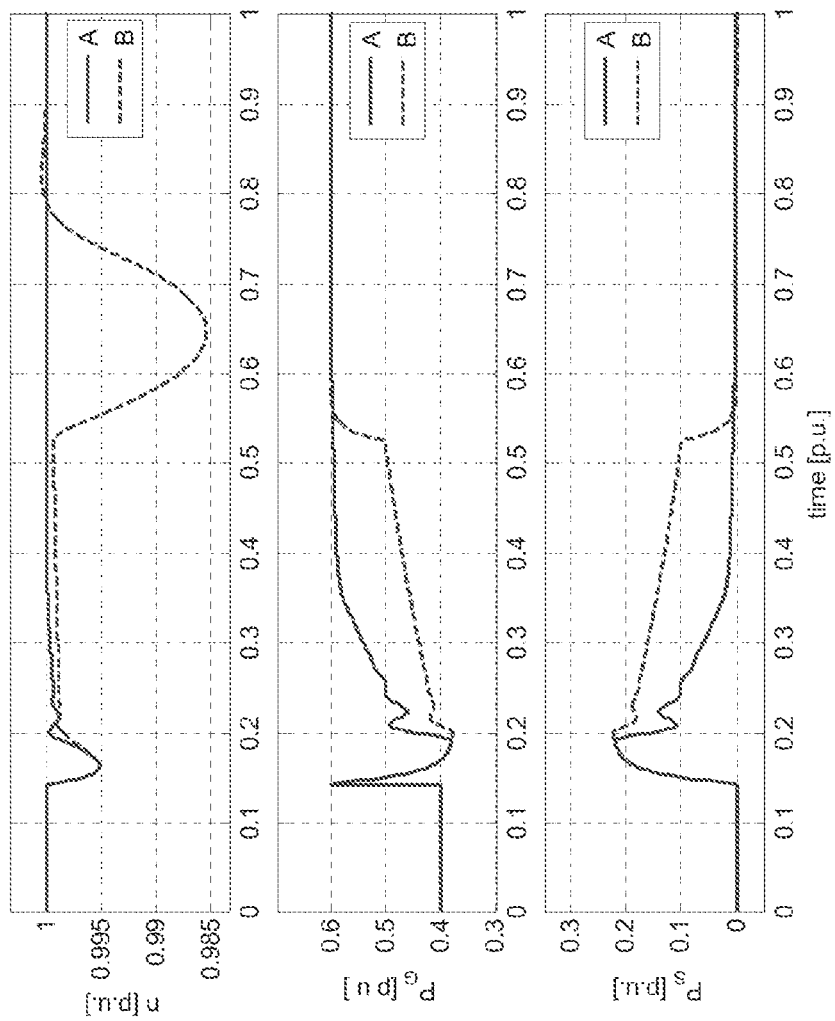
FIG. 2 shows a comparison between transient behavior of the power system according to FIG. 1 (solid lines) and a power system according to the prior art (broken lines).

FIG. 2 shows in solid lines A an exemplary transient behavior of the power system 1 of FIG. 1.

Between time 0.1 and 0.2, load requirement $P_{Load}$ of external load 2 suddenly increases which is shown by a sudden small drop in speed n from about 1 to about 0.995. In response to this, power $P_S$ provided by the electric storage device 6 to the external load 2 increases from about 0 to a little above 0.2. According to the disclosed embodiment, after a short sub-transient effect, power $P_G$ provided by all the generators 4 together increases from time 0.2 to about 0.4, such that power $P_S$ provided by the electric storage device 6 to the external load 2 decreases to about 0. At the same time, the speed approaches a steady state and therefore the power produced by the generators is equal to the applied external load.

The broken lines B show that without the disclosed embodiment, this state is still not achieved by time 0.55 but the long power consumption from the storage device 6 leads to an emptying of energy storage device 6 and a pronounced drop in speed n between time 0.55 and 0.8 until power provided by the prime movers 3 to the generators 4 can compensate for the increased load requirement $P_{Load}$ of external load 2. This represents a worst-case scenario, but even if it the storage does not become suddenly empty, the speed deviation from its reference is present for an undesired long duration.

List of Reference Numbers:
1 power system
2 external load
3 prime mover
4 generator
5 control device
6 energy storage device
7 first measuring device
8 second measuring device
9 third measuring device
10 computer
11 storage control device
12 power electronics
13 SOC control logic
N number of prime movers
n speed of prime mover
$n_i$ speed of $i^{th}$ prime mover
$n_{ref}$ reference value for speed
$n_{ref,i}$ reference value for speed of $i^{th}$ prime mover
f frequency of power grid
$f_{ref}$ reference value for frequency of power grid
$P_{Load}$ power requirement of external load
$P_{G,i}$ power generated by $i^{th}$ generator
$P_{Storage}$ power provided by energy storage device
$P_{Storage,cmd}$ command value for power provided by energy storage device
u control command
SOC state of charge of energy storage device
T temperature of energy storage device
V internal voltage of energy storage device
I current magnitude delivered by/to energy storage device

The invention claimed is:

1. A power system, comprising:
a number (N) of prime movers having a variable speed ($n_i$), configured to generate mechanical power by providing a mechanical drive force, wherein the number (N) of prime movers is one or more;
at least one generator configured to receive the drive force of at least one of the number (N) of prime movers) to generate an electrical power, wherein the at least one generator is configured to couple with a power grid, and the power grid is configured to transmit the electrical power having a frequency (f) and to couple with an external load;
at least one controller configured to control the variable speed ($n_i$) to a speed reference ($n_{ref,i}$) of at least one of the number (N) of prime movers and/or the frequency (f) of the power grid;
at least one energy storage device configured to, at least temporarily, provide to the external load and/or receive from the external load, the electrical power via the power grid;
at least one first measuring device configured to provide at least one first signal to the at least one controller to determine an amount of electrical power ($\Sigma P_{G,i}$) to be generated by the at least one generator to meet a power requirement ($P_{load}$) the external load;
wherein the at least one controller is configured to receive the at least one first signal and to influence the control of the variable speed ($n_i$) of the at least one of the number (N) of prime movers or the frequency (f) of the power grid taking into account the at least one first signal to change the mechanical power generated by the at least one of the number (N) of prime movers such that the electrical power provided by the at least one generator approaches the power requirement ($P_{load}$) the external load in situations where the power requirement ($P_{load}$) the external load is at least partially provided by the at least one energy storage device, and
wherein the at least one controller is configured to control the variable speed ($n_i$) of the at least one of the number (N) of prime movers and, at least temporarily, apply an additive or multiplicative feed-forward-control of actuators of the at least one of the number (N) of prime movers proportional to the received at least one first signal to influence the mechanical power produced by the prime mover, wherein the at least one first signal is representative for the electric power provided by the at least one energy storage device to the power grid.

2. The power system of claim 1, comprising one or more components of the power grid.

3. The power system of claim 1, wherein the at least one controller is configured to control the variable speed ($n_i$) of the at least one of the number (N) of prime movers (3) and, at least temporarily, apply a correction of the speed reference ($n_{ref,i}$) proportional to the received at least one first signal to influence the mechanical power produced by the prime mover.

4. The power system of claim 1, comprising a first control logic and a second control logic, wherein the first control logic is configured to control a state of charge of the at least one energy storage device, wherein the second control logic is configured to determine the electrical power or currents exchanged by the at least one energy storage device with the power grid in dependence on the variable speed ($n_i$) or the frequency (f) and to determine whether the power system shows transient behavior based on a frequency deviation from a reference value ($f_{ref}$) for frequency of the power grid.

5. The power system of claim 1, wherein the at least one first signal is representative for:
a command of the electrical power provided by the at least one energy storage device to the power grid; and/or
the power requirement ($P_{load}$) of the external load.

6. The power system of claim 1, comprising at least one storage controller configured to track and/or control a sum of power commands from the at least one controller and a first control logic by controlling current magnitudes and voltage levels of the at least one energy storage device, wherein the first control logic is configured to control a state of charge of the at least one energy storage device.

7. The power system of claim 1, comprising at least one second measuring device configured to provide at least one second signal to the at least one controller to determine the variable speed ($n_i$) of at least one of the number (N) of prime movers or the frequency (f) of the power grid.

8. The power system of claim 7, comprising at least one third measuring device configured to provide at least one third signal to the at least one controller to determine the electrical power provided by the at least one generator to the power grid.

9. A system, comprising:
at least one controller, wherein in an operating state of a prime mover configured to drive a generator to provide an electrical power to an external load via a power grid coupled to at least one energy storage device, the at least one controller is configured to, at least temporarily, when a power requirement ($P_{load}$) of the external load is at least partially provided by the at least one energy storage device,
receive at least one first signal to determine an amount of the electrical power ($P_{G,i}$) to be generated by the at least one generator to meet the power requirement ($P_{load}$) of the external load; and
control a variable speed ($n_i$) of the prime mover in dependence on the at least one first signal to change a mechanical power generated by the prime mover such that the electrical power provided by the at least one generator approaches the power requirement ($P_{load}$) of the external load;
wherein the at least one controller is configured to control the variable speed ($n_i$) of the prime mover and, at least temporarily, apply an additive or multiplicative feed-forward-control of an actuator of the prime mover proportional to the received at least one first signal to influence the mechanical power generated by the prime mover, wherein the at least one first signal is representative for the electric power provided by the at least one energy storage device to the power grid.

10. The system of claim 9, comprising the prime mover coupled to the generator.

11. The system of claim 9, wherein the at least one controller is configured to control the variable speed ($n_i$) of the prime mover and, at least temporarily, apply a correction of the speed reference ($n_{ref,i}$) proportional to the received at least one first signal to influence the mechanical power produced by the prime mover.

12. The system of claim 9, comprising a first control logic and a second control logic, wherein the first control logic is configured to control a state of charge of the at least one energy storage device, wherein the second control logic is configured to determine the electrical power or currents exchanged by the at least one energy storage device with the power grid in dependence on the variable speed ($n_i$) or the frequency (f) and to identify transient behavior based on a frequency deviation from a reference value ($f_{ref}$) for frequency of the power grid.

13. The system of claim 9, comprising at least one storage controller configured to track and/or control a sum of power commands from the at least one controller and a first control logic by controlling current magnitudes and voltage levels of the at least one energy storage device, wherein the first control logic is configured to control a state of charge of the at least one energy storage device.

14. The system of claim 9, wherein the at least one controller is configured to receive at least one second signal to determine the variable speed ($n_i$) of the prime mover or the frequency (f) of the power grid.

15. The system of claim 14, wherein the at least one controller is configured to receive at least one third signal to determine the electrical power provided by the at least one generator to the power grid.

16. The system of claim 9, comprising the prime mover, the generator, or a combination thereof.

17. The system of claim 9, comprising the at least one energy storage device.

18. A method to control at least one prime mover having a variable speed ($n_i$), wherein the at least one prime mover is configured generate a mechanical drive force to drive at least one generator to generate an electrical power that is provided to a power grid, wherein the power grid is coupled to an external load and at least one energy storage device, wherein the at least one energy storage device is configured to at least temporarily provide electrical power to the power grid, wherein in situations when a power requirement ($P_{load}$) of the external load is at least partially provided by the at least one energy storage device, the method comprises:
receiving at least one first signal at a controller to determine an amount of electrical power ($P_{G,i}$) to be generated by the at least one generator to meet a power requirement ($P_{load}$) of the external load, wherein the at least one first signal is representative for the electric power provided by the at least one energy storage device to the power grid;
controlling the variable speed ($n_i$) of the at least one prime mover or a frequency (f) of the power grid in dependence on the at least one signal to change a mechanical power generated by the at least one prime mover such that the electrical power provided by the at least one generator approaches the power requirement (P load) of the external load; and
applying, at least temporarily, an additive or multiplicative feed-forward-control of an actuator of the at least one prime mover proportional to the received at least one first signal to influence the mechanical power generated by the at least one prime mover.

19. The method of claim 18, comprising:
controlling a state of charge of the at least one energy storage device;
determining the electrical power or currents exchanged by the at least one energy storage device with the power grid in dependence on the variable speed ($n_i$) or the frequency (f); and
identifying transient behavior based on a frequency deviation from a reference value ($f_{ref}$) for frequency of the power grid.

20. The method of claim 18, comprising tracking and/or controlling a sum of power commands by controlling current magnitudes and voltage levels of the at least one energy storage device.

* * * * *